United States Patent
Wieczorek et al.

(10) Patent No.: US 9,834,145 B2
(45) Date of Patent: Dec. 5, 2017

(54) ACTUATOR FOR A POWER FOLD MECHANISM OF A REAR VIEW DEVICE FOR A VEHICLE

(71) Applicant: SMR Patents S.à.r.l., Luxembourg (LU)

(72) Inventors: Romeo Wieczorek, Esslingen (DE); Michael Swienty, Weimar (DE)

(73) Assignee: SMR PATENTS S.A.R.L., Luxembourg (LU)

( * ) Notice: Subject to any disclaimer, the term of this patent is extended or adjusted under 35 U.S.C. 154(b) by 0 days.

(21) Appl. No.: 15/384,036

(22) Filed: Dec. 19, 2016

(65) Prior Publication Data

US 2017/0174136 A1  Jun. 22, 2017

(30) Foreign Application Priority Data

Dec. 21, 2015  (EP) .................................... 15201747

(51) Int. Cl.
  *B60R 1/074* (2006.01)
  *G03B 17/56* (2006.01)
  *F03G 7/06* (2006.01)
(52) U.S. Cl.
  CPC .............. *B60R 1/074* (2013.01); *F03G 7/065* (2013.01); *G03B 17/561* (2013.01)
(58) Field of Classification Search
  None
  See application file for complete search history.

(56) References Cited

U.S. PATENT DOCUMENTS

| 5,150,702 A * | 9/1992 | Miyanaga .......... A61B 1/00096 348/362 |
| 9,394,888 B2 | 7/2016 | Alexander et al. |
| 2001/0025477 A1 * | 10/2001 | Hara ...................... F03G 7/065 60/772 |
| 2006/0037315 A1 * | 2/2006 | Zanella .................. H02N 2/101 60/527 |
| 2008/0247748 A1 * | 10/2008 | Tanimura ................. G02B 7/08 396/502 |

(Continued)

FOREIGN PATENT DOCUMENTS

| DE | 102005059081 A1 | 2/2007 |
| DE | 102015103105 A1 | 9/2015 |

(Continued)

OTHER PUBLICATIONS

Extended European Search Report, Application No. EP15201747.1 filed Mar. 1, 2016.

*Primary Examiner* — W B Perkey
(74) *Attorney, Agent, or Firm* — MacMillan, Sobanski & Todd, LLC

(57) ABSTRACT

The invention relates to an actuator for a power fold mechanism of a rear view device for a vehicle, which is preferably for a motor vehicle. The actuator includes at least one actuator pin and at least one drive element arranged on the actuator pin to be rotatable at least partially around the actuator pin. At least one first shape memory alloy (SMA) element, in particular having the form of a SMA wire is connected to the at least one drive element. At least one retraction element is connected to the at least one first SMA element and biased by the retraction element.

15 Claims, 2 Drawing Sheets

(56) References Cited

U.S. PATENT DOCUMENTS

| | | | |
|---|---|---|---|
| 2010/0328015 A1* | 12/2010 | Vanska | G03B 11/043 337/123 |
| 2011/0222176 A1* | 9/2011 | Browne | B60R 1/072 359/846 |
| 2011/0314742 A1* | 12/2011 | Hsu | G03B 9/08 49/358 |
| 2014/0306624 A1 | 10/2014 | Namuduri et al. | |

FOREIGN PATENT DOCUMENTS

| | | |
|---|---|---|
| EP | 2781743 A1 | 9/2014 |
| WO | 2014162234 A2 | 10/2014 |
| WO | 2014162234 A3 | 10/2014 |

\* cited by examiner

ACTUATOR FOR A POWER FOLD MECHANISM OF A REAR VIEW DEVICE FOR A VEHICLE

CROSS-REFERENCE TO RELATED APPLICATIONS

This application claims priority from European Patent Application No. EP 15201747.1, filed Dec. 21, 2015, the disclosure of which is incorporated herein by reference in its entirety.

BACKGROUND OF THE INVENTION

This invention relates to an actuator for a power fold mechanism of a rear view device for a vehicle, preferably for a motor vehicle. The invention also relates to a rear view device for a vehicle, preferably for a motor vehicle, having such an actuator installed.

In modern day vehicles, actuators employing shape memory alloys are utilized for retractably tilting rear view device housings of a vehicle, preferably of a motor vehicle. The rear view device housings in which back view elements are contained are commonly mounted on panels arranged on the front doors such that the rear view device housings project outwardly in a sidewise direction. During maneuvering the vehicle in narrow spaces, sensor means installed in the rear view device, or in some other location in the vehicle, can sense imminent danger to the rear view device, for example due to an imminent collision with a pillar or another vehicle, and can initiate tilting the rear view device housings so as to avoid the collision.

However, the actuators that are known in the prior art require rather generously spaced installation compartments for installing the actuators in the rear view device. This is mainly due to the wire lengths which could easily be 300 mm and more, i.e. depending on the mirror and/or vehicle type. One problem associated with storing long wires made of active material is that the wires will likely get destroyed when they are being bent or folded. A space saving solution for storing long wires made of active material is described in EP 2781743 A1. The prior art document suggests to wind a wire made of active material around a rotatably mounted actuator pin. The prior art actuator uses the so called "JoJo-effect", i.e. when the wire consisting of active material is activated, e.g. by means of electricity, the wire shortens, and the actuator pin starts to rotate about its own axes which causes the rear view device housing that is mechanically coupled to the actuator pin to fold in.

Winding up a wire consisting of active material around an actuator pin can be a space saving solution, but since the wire is wound around the surface of the actuator pin, frictional forces will arise that decrease the overall efficiency of the actuator. Also, by winding up a wire consisting of active material, the maximum folding sizes of the utilized wire need to be taken into account when designing the actuator, so that the wire does not get destroyed by overbending the wire during operation. Further, only wires consisting of active material that have a rather thin diameter allow to be wound up, since wires having a larger diameter cannot be sufficiently bent without getting destroyed. However, the maximum tension of a wire consisting of active material increases with the diameter of the wire. Therefore, the prior art actuator using the JoJo-effect can only move rear view device housings that are sufficiently lightweight.

Therefore, the invention aims at providing an actuator for a rear view device of a vehicle that overcomes the above mentioned problems. Namely, it would be desirable to provide an improved interaction between an active material actuator and an actuator pin.

SUMMARY OF THE INVENTION

The invention provides an actuator for a power fold mechanism of a rear view device for a vehicle, preferably for a motor vehicle, comprising at least one actuator pin; at least one drive element being arranged on the actuator pin to be rotatable at least partially around the actuator pin; at least one first shape memory alloy (SMA) element, in particular in form of a SMA wire being connected to the at least one drive element; and at least one retraction element, to which the at least one first SMA element is connected to be biased by the retraction element.

The actuator could be, for example, mounted on a panel of the rear view device that is arranged on the front door of a vehicle, where the panel is arranged to also hold the rear view device housing. The actuator comprises at least one actuator pin that could have an essentially cylindrical shape and that could consist of metal, plastic or ceramic material. The actuator pin could be mounted at an essentially vertical position relative to the rear view device housing, and could be connected to the panel in such a way so that it cannot rotate about its own axis.

The actuator also comprises at least one drive element, wherein the at least one drive element is arranged on the actuator pin and is arranged to be rotatable at least partially around the actuator pin. The at least one drive element could have an essentially disk like geometry, where the at least one drive element could be essentially flat, e.g. having a height of just a few millimeters. Also, the at least one drive element could be made of a metal, plastic, and/or ceramic material. For arranging the at least one drive element on the actuator pin, the at least one drive element could comprise an annular opening that essentially corresponds to, or is made slightly larger than, the cross-section of the actuator pin so that the at least one drive element can be in sliding contact with the actuator pin and being located around the actuator pin. By using this type of connection, the at least one drive element can at least partially, but preferably completely, i.e. by 360°, rotate around the actuator pin. The at least one drive element could be essentially arbitrarily shaped around the annular opening. However, preferably, the at least one drive element also comprises a fin-like structure that extends away from the axis of the actuator pin. Also, more than just one drive element could be comprised in the actuator. For example, a plurality of drive elements could be located on top of each other on the actuator pin.

The actuator also comprises at least one first shape memory alloy (SMA) element, in particular in form of a SMA wire being connected to the at least one drive element. Here, the term "connected to the at least one drive element" can be used to define that the first SMA element is connected by at least one point on its length to at least one point of the at least one drive element, preferably to a point of the at least one drive element that is located further away from the axis of the actuator pin. If more than just one drive element is used in the actuator, the first SMA element is guided essentially directly, i.e. without bending the first SMA element, from one drive element to the next, i.e. to a subsequent drive element.

The actuator further comprises at least one retraction element to which the at least one first SMA element is connected to be biased by the retraction element. Here, the at least one first SMA element is arranged to be connected to the at least one retraction element, and wherein the retraction element is arranged to exert a restoring force onto the first SMA element. Essentially, one of the end portions of the first SMA element could be connected to the second component of the retraction element, and the first SMA element could be also connected further up the length of the wire to the at least one drive element so that the first SMA element is essentially led directly, i.e. without bending the SMA element, from the at least one retraction element to the at least one drive element. Also, in case that just one drive element is used in the actuator, a joint element of the rear view device housing can be mechanically coupled to the at least one drive element so that a rotation of the drive element causes the rear view device housing to move from the normal position into a folded position. However, if more than one drive element is used, the at least one joint element of the rear view device is mechanically coupled to the drive element that is located on the top of the actuator pin. Here, the term "located on the top" can be used to refer to that drive element that is located the furthest away from the retraction element and/or furthest away from that position where the actuator pin is mounted to the housing.

Advantageously, by having the SMA element directly arranged between a plurality of drive elements, or at least between the at least one retraction element and at least one drive element, the SMA element is not bent so that the SMA material is not damaged during operation. Also, since no bending motion is required, an SMA element having a larger diameter can be employed which makes the actuator more powerful.

In one example, the at last one drive element comprises at least a first fin element extending away from a central axis of the actuator pin, and/or at least one attachment point for the at least one first SMA element, preferably at the free end of the first fin element. The first fin element could be essentially elongated and could be arranged on the circumference of the at least one actuator pin. The at least one attachment point could be located on that end of the first fin element that points away from the at least one actuator pin.

In yet another example, the at least one attachment point comprises a post and/or a welding spot. For example, the attachment point could be a post, wherein the term "post" can be used to refer to an essentially cylindrical structure that is arranged at least in part perpendicular to the surface of the drive element. For example, the post could be a screw. Alternatively, or in addition, the attachment point could be a welding spot, wherein at least part of the surface of the at least one first SMA element is welded onto the first fin element. Advantageously, by attaching the at least one first SMA element just in one spot to the drive element allows to span the at least one first SMA element directly between different drive elements.

In yet another example, at least two, preferably a plurality of drive elements are arranged on different levels along the actuator pin, being arranged one above the other with drive elements preferably having a radial offset relative to each other. Here, the term "on different levels" can be used to refer to a mounting position where at least two drive elements are arranged on the actuator pin in a manner so that the drive elements are essentially stacked on top of each other on the actuator pin.

Also, in one example, the at least one first SMA element runs essentially in a straight line between the two drive elements. Here, the term "straight line" can be used to define that the SMA element is essentially not bent and can freely run from a first drive element to a subsequent drive element.

In another example, the at least one first SMA element is attached to the two drive elements via the respective attachment points which are radially offset from each other, preferably wherein two adjacent attachment points are radially offset by an angle of at least 30°. Here, the term "radially offset" can be used to define that the attachment points are not being arranged vertically below each other, but being arranged so that the SMA element is gradually led around the at least one actuator pin as it is spun from the at least one retraction element to the at least one drive element, and/or from one drive element to the next, i.e. subsequent, drive element. Also, the radial position of the attachment points can be offset by at certain angle. For example, this angle could be in the region between 30° and 90°.

In yet another example, at least one slide element is arranged on the actuator between two drive elements, preferably a plurality of slide elements and drive elements are arranged in an alternating fashion along the length of the actuator pin. The at least one slide element could be a disc like structure having an annular opening that essentially corresponds to, or is made slightly larger than, the cross-section of the actuator pin so that the slide element can be in sliding contact with the actuator pin and could be arranged around the actuator pin. The at least one slide element could be made of plastic material and could have essentially the same height than the at least one drive element. Advantageously, by arranging at least one slide element between two drive elements, the drive elements can smoothly and silently rotate around the actuator pin.

In another example, at least two, preferably three, drive elements, or at least two, preferably three, fin elements are arranged in one level at the actuator pin. Here, the term "arranged in one level" can be used to refer to a mounting position where two drive elements are arranged on the actuator pin in a manner so that the drive elements are located at essentially the same height on the actuator pin. The at least two drive elements can be radially orientated so that the first SMA element can be connected to each one of the at least two drive elements on at least two respective radial positions. Advantageously, by arranging at least two drive elements on the same level at the actuator pin allows to achieve an actuator having very small dimensions, since the first SMA element can be led around the actuator pin in one level requiring less space.

In yet another example, the actuator comprises a second SMA element, preferably in form of a SMA wire, wherein the second SMA element is connected to the at least one drive element, preferably at an attachment point at a second fin element extending away from a central axis of the actuator pin, in particular in an opposite direction at the respective first fin element. The second fin element could have a similar shape than the first fin element and could extend away from the central axis of the actuator pin. For example, the second fin element could be located on the at least one drive element on the opposite side of the first fin element. Also, if more than one drive element is used, the second SMA element could be spun from one drive section to the next drive section in a similar manner than the first SMA element is spun. Advantageously, the actuating force of the actuator can be doubled by using at least two SMA elements.

In one example, the at least one actuator pin is non-rotatably mounted on a base plate of the rear view device. Here, the term "non-rotatably" can be used to define that the actuator pin is mounted in such a manner that it cannot rotate around its own vertical axis. The base plate of the rear view device could be located on the vehicle door and the rear view device housing could be foldable in relation to the base plate.

In one example, the at least one retraction element comprising a resilient material, preferably a spring, for biasing the at least one first SMA element, and preferably wherein the at least one retraction element is arranged on the actuator pin. The retraction element could, for example, be a spring and could be used for tensioning the SMA element. In general, the retraction element could consist of two components that have a similar shape to the drive element. For example, the first component could be fixedly mounted to the bottom of the actuator pin so that it cannot turn around the actuator pin. Here, the term "to the bottom" can be used to refer to a position that is below the at least one drive element on the actuator pin. A second component could be arranged above the first component on the actuator pin, where both the first and the second components are connected by elastic means, where a rotational movement of the second component relative to the first element can be against a restoring force of the elastic means.

In one example, the actuator comprises at least one control unit, wherein the control unit is connected to the at least first and/or second SMA element to supply electric energy and/or heat thereto. For example, electrical wires from the control unit could be connected to the at least first SMA element to actuate the SMA element so that it can contract to move the actuator. In case that a second SMA element is used in the actuator, the control unit could be also connected to the second SMA element to actuate the second SMA element.

In another example, at least one joint element for connecting a housing of the rear view device to the at least one drive element is mechanically coupled to the at least one drive element. Advantageously a rotation of the drive element moves the joint element which in turn causes the rear view device housing to move from the normal position into a folded position. Also, if more drive elements than the at least one drive element are used in the actuator, the at least one joint element of the rear view device is mechanically coupled to the drive element that is located on top of the actuator pin. Here, the term "located on the top" can be used to refer to that drive element that is located the furthest away from the retraction element and/or from that position where the actuator pin is mounted to the housing.

In yet another example, the at least one drive element comprises plastic material and/or ceramic material. For example, by choosing a non-conductive material, the drive elements can be isolated against each other.

The invention also relates to a rear view device for a vehicle, preferably for a motor vehicle, comprising an actuator, preferably an actuator according to the invention. Preferably, the rear view device comprises at least one mirror element and/or camera.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
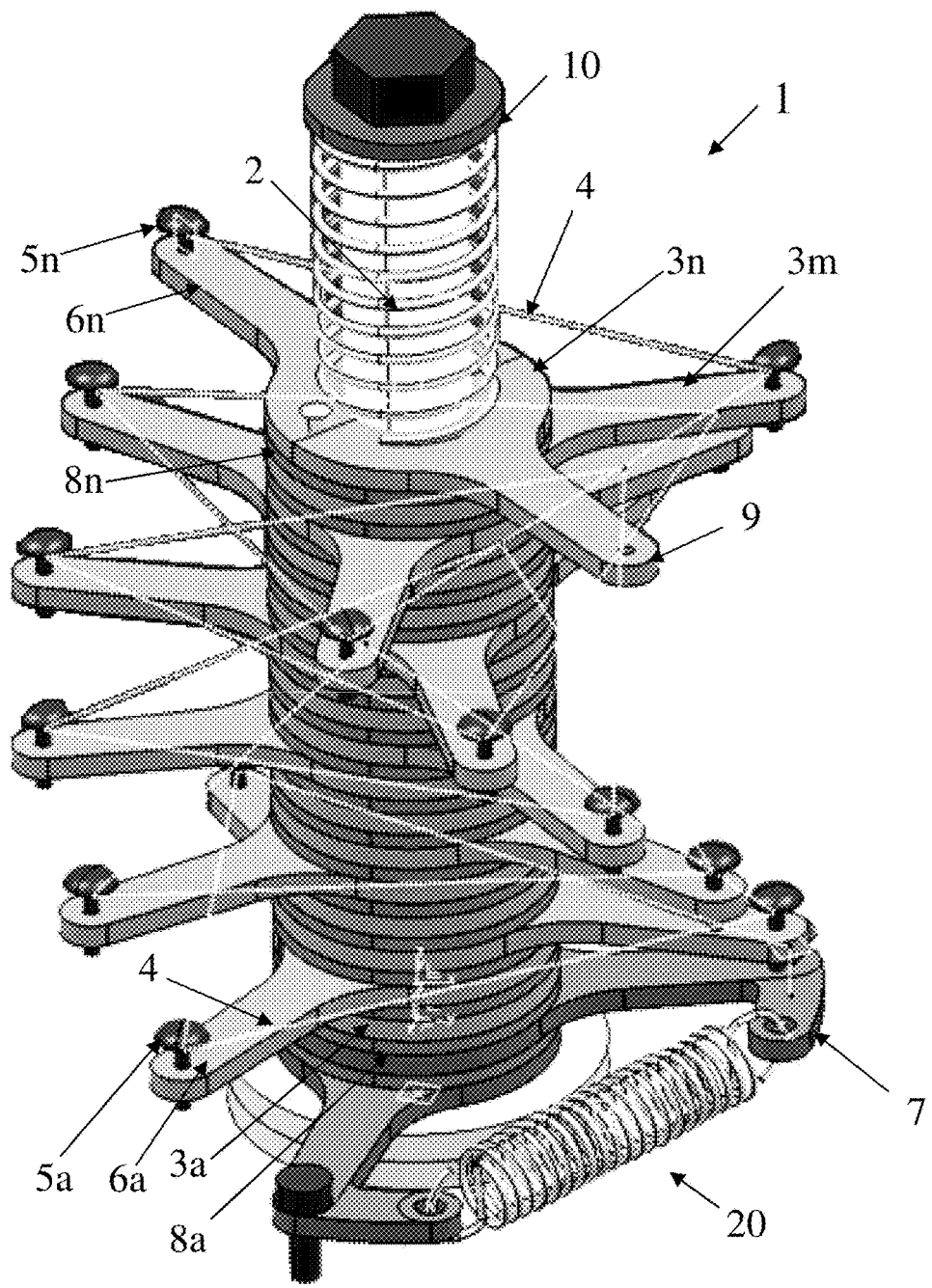
FIG. 1 is a schematic view of an actuator according to a first embodiment of the invention.

Referring now to the drawings, there is illustrated in FIG. 1 an actuator 1 according to a first embodiment of the invention. As illustrated in FIG. 1, the actuator 1 comprises an actuator pin 2 and a plurality of drive elements 3*a*-3*n* that are arranged on the actuator pin 2 so that the drive elements 3*a*-3*n* are rotatable around the actuator pin 2. In FIG. 1 it is shown that a first shape memory alloy SMA wire 4 is connected to the drive elements 3*a*-3*n*. It also shown that the first SMA element 4 spans essentially in a straight line between the drive elements 3*a*-3*n* so that the first SMA element 4 can be led around the actuator pin 2 without bending the first SMA element 4. The first SMA element 4 is connected via attachment points 5*a*-5*n* to first fin elements 6*a*-6*n* on the drive elements 3*a*-3*n*. In the here shown example, the attachment points 5*a*-5*n* are posts on the first fin elements 6*a*-6*n* to which the SMA element 4 is connected to. However, the skilled person would know alternative ways how the SMA element 4 could be connected to the fin elements 6*a*-6*n* such as, for example, by means of welding or soldering the first SMA element 4 to the fin elements 6*a*-6*n*.

FIG. 1 also shows a retraction element 7, to where the at least first SMA element 4 is connected (not shown). The retraction element 7 exerts a restoring force onto the first SMA element 4 for tensioning the first SMA element 4. The shown retraction element 7 applies the restoring force by means of a spring 20. However, the skilled person would know that any resilient material could be used for biasing the first SMA element 4.

In the Figure it is also shown that slide elements 8*a*-8*n* are arranged between the drive elements 3*a*-3*n*. However, the skilled person would know that these slide elements 8*a*-8*n* are not crucial for the operation of the actuator 1. However, by using these slide elements 8*a*-8*n*, the drive elements 3*a*-3*n* can easily turn during operation of the actuator 1. In one example (not shown in FIG. 1) a second SMA element can be used in a similar fashion than the at least one first SMA element 4. Therefore, the drive elements 3*a*-3*n* could comprise a second fin element 9 extending away from a central axis of the actuator pin 2 and being located opposite the first element 5*a*-5*n*. However, the skilled person would know that the drive elements 3*a*-3*n* could also comprise more than two fin elements 6*a*-6*n* to connect further SMA elements to, so as to increase the power of the actuator 1.

Also in the illustrated example, the segments, e.g. the drive elements 3*a*-3*n* and the slide elements 8*a*-8*n* that are arranged on the actuator pin 2 are kept together, i.e. being compressed, by the force of a spring 10 so that these elements stay together in one packet.

During operation of the actuator 1, i.e. when the at least one first SMA element 4 is activated, for example by applying an electric current, or heat to the at least one first SMA element 4, the at least one first SMA element 4 will contract, i.e. will shorten its length. As the at least one first SMA element 4 is getting shorter, the distances between adjacent attachment points 5*a*-5*n* on adjacent drive elements 3*a*-3*n* is decreasing, and hence the drive elements 3*a*-3*n* start to rotate on the actuator pin 2. In the shown example, the drive element 3*n* on the top, i.e. the drive element 3*n* that is located the furthest away from the retraction element 7 and/or from that position where the actuator pin 2 is mounted (not shown in FIG. 1), will have the largest rotation angle, since the drive elements below 3*a*-3*n* will sequentially turn when the at least one first SMA element 4 contracts. As it is shown in FIG. 1 and explained above, the at least one first SMA element 4 is biased by a retraction element 7 that causes the rotation to be reversed, once the at least one first SMA element 4 is made to increase its length again, i.e. when the at least one first SMA element 4 is deactivated.

A joint element (not shown in FIG. 1) of the rear view device housing can be mechanically coupled to the drive element 3n so that a rotation of the drive element 3n moves the joint element, which in turn causes the rear view device housing to move from the normal position into the folded position.

Figure 2:
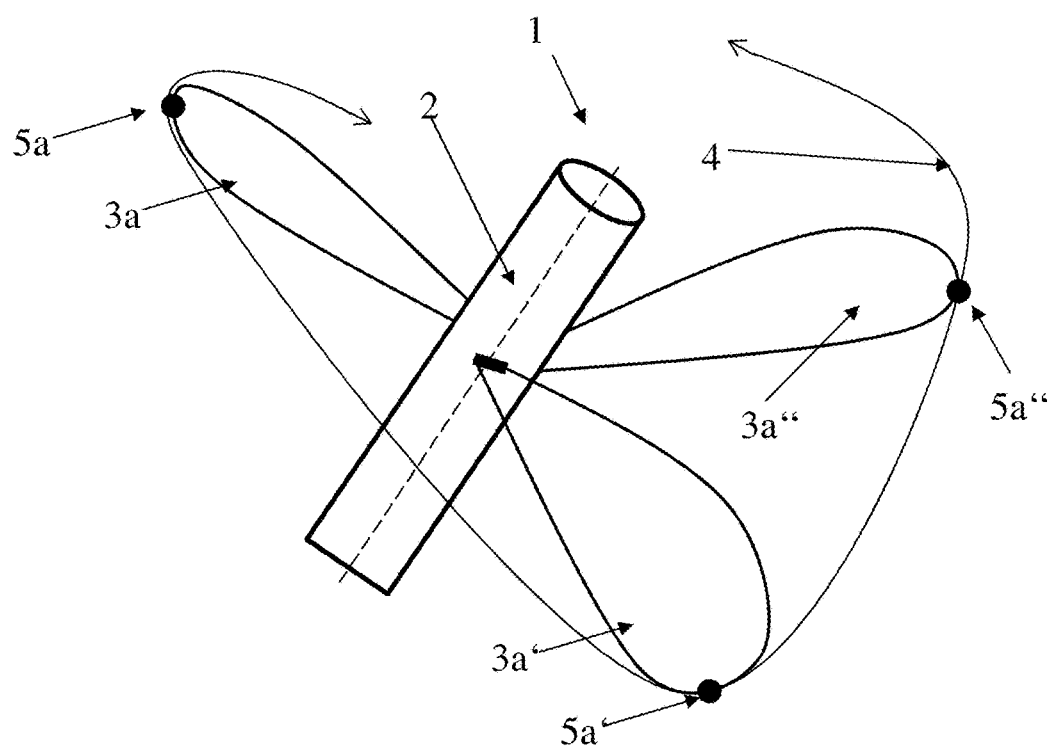
FIG. 2 is a schematic view of an actuator according to a second embodiment of the invention.

FIG. 2 shows a schematic of an actuator 1 according to a second embodiment of the invention. In the shown example, three drive elements 3a, 3a', 3a'' are arranged in one level at the actuator pin 2 and being rotatable at least partially around the actuator pin 2. In the shown example, the three drive elements 3a, 3a', 3a'' are radially orientated in such a manner that the SMA element 4 is connected to each one of the three drive elements 3a, 3a', 3a'' at respective attachment points 5a, 5a', 5a''.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An actuator for a power fold mechanism of a rear view device for a vehicle, preferably for a motor vehicle, comprising:
   at least one actuator pin;
   a plurality of drive elements arranged on the actuator pin to be rotatable at least partially around the actuator pin, the plurality of drive elements arranged on different levels along the actuator pin and arranged one above the other;
   at least one first shape memory alloy (SMA) element, in particular in form of a SMA wire being connected to the at least one drive element; and
   at least one retraction element, to which the at least one first SMA element is connected to be biased by the retraction element.

2. The actuator of claim 1, wherein the at least one drive element comprises at least a first fin element extending away from a central axis of the actuator pin and/or at least one attachment point for the at least one first SMA element, preferably at the free end of the first fin element.

3. The actuator of claim 2, wherein the at least one attachment point comprises a post and/or a welding spot.

4. The actuator claim 1, wherein the plurality of drive elements is arranged having a radial offset relative to each other.

5. The actuator of claim 1, wherein the at least one first SMA element extends substantially in a straight line between the two drive elements.

6. The actuator of claim 1, wherein the at least one first SMA element is attached to two of the plurality of drive elements via the respective attachment points which are radially offset from each other, preferably wherein two adjacent attachment points are radially offset by an angle of at least 30°.

7. The actuator of claim 1, wherein at least one slide element is arranged on the actuator pin between adjacent drive elements, such that a plurality of slide elements and the plurality of drive elements are arranged in an alternating fashion along the length of the actuator pin.

8. The actuator of claim 1, wherein one of at least two drive elements or least two fin elements are arranged on one level of the actuator pin.

9. The actuator of claim 1, wherein the at least one drive element includes a first fin element and a second fin element and the actuator comprises a second SMA element, preferably in form of a SMA wire, wherein the second SMA element is connected to the at least one drive element, preferably at an attachment point at a second fin element extending away from a central axis of the actuator pin, in particular in an opposite direction at the respective first fin element.

10. The actuator of claim 1, wherein the at least one actuator pin is non-rotatably mounted on a base plate of the rear view device.

11. The actuator of claim 1, wherein the at least one retraction element comprises a resilient material, preferably a spring, for biasing the at least one first SMA element, and preferably wherein the at least one retraction element is arranged on the actuator pin.

12. The actuator of claim 9, further comprising at least one control unit, wherein the control unit is connected to the at least first and/or second SMA element to supply electric energy and/or heat thereto.

13. The actuator of claim 1, wherein at least one joint element for connecting a housing of the rear view device to the at least one drive element is mechanically coupled to the at least one drive element.

14. The actuator of claim 1, wherein the at least one drive element comprises plastic material and/or ceramic material.

15. A rear view device for a vehicle, preferably for a motor vehicle, comprising an actuator according to claim 1, wherein the rear view device comprises at least one minor element and/or camera.

* * * * *